United States Patent [19]
Yanagibashi

[11] Patent Number: 5,353,177
[45] Date of Patent: Oct. 4, 1994

[54] METHOD AND APPARATUS FOR POSITIONING A MAGNETIC HEAD UNIT ON A TRACK CENTERLINE

[75] Inventor: Yoshinobu Yanagibashi, Tokyo, Japan

[73] Assignee: TEAC Corporation, Tokyo, Japan

[21] Appl. No.: 27,205

[22] Filed: Mar. 4, 1993

[30] Foreign Application Priority Data

Mar. 9, 1992 [JP] Japan .................. 4-085988
Mar. 9, 1992 [JP] Japan .................. 4-085989
Mar. 9, 1992 [JP] Japan .................. 4-085990

[51] Int. Cl.[5] ................................ G11B 5/584
[52] U.S. Cl. .................. 360/77.12; 360/73.06; 360/77.01
[58] Field of Search .......... 360/77.12, 78.02, 77.06, 360/73.06, 77.07, 78.13, 78.14

[56] References Cited

U.S. PATENT DOCUMENTS

| | | | |
|---|---|---|---|
| 4,786,984 | 11/1988 | Seeman | 360/31 |
| 4,796,125 | 1/1989 | Karsh | 360/77.12 |
| 5,091,806 | 2/1992 | Maeda et al. | 360/77.06 X |
| 5,227,931 | 7/1993 | Misumi | 360/77.06 X |

Primary Examiner—Aristotelis Psitos
Assistant Examiner—James L. Haberheml
Attorney, Agent, or Firm—Woodcock Washburn Kurtz Mackiewicz & Norris

[57] ABSTRACT

A read/write head unit is moved across a reference burst track on magnetic tape from one longitudinal edge thereof toward the other through a series of transverse locations. The peak amplitude of the output from a read amplifier, representative of the reference burst, is detected at each transverse location. The set of amplitude values thus obtained is then referred to data, compiled by testing a number of tape transports and a number of tape assemblies, representative of standard categories each comprising an allowable range of deviations from a different standard set of amplitude values and a corresponding distance to be traversed by the head unit from the last of the series of transverse locations to the centerline of the reference burst track. If the detected set of amplitude values has proved to belong to either of the standard categories, the head unit is moved the corresponding distance from the last of the series of transverse locations to the centerline position on the reference burst track, and hence on Track Zero which is aligned with the reference burst track.

6 Claims, 7 Drawing Sheets

METHOD AND APPARATUS FOR POSITIONING A MAGNETIC HEAD UNIT ON A TRACK CENTERLINE

BACKGROUND OF THE INVENTION

This invention relates generally to magnetic tape transports, sometimes referred to as tape units, tape drives, tape decks, etc., for use with a replaceable tape assembly known as a tape cartridge or cassette, and particularly to those used as a subsystem to enable a host system to obtain access to data on the magnetic tape. More particularly, the invention concerns a method of, and means for, accurately positioning a read/write head unit with respect to a plurality or multiplicity of longitudinal tracks on the tape in such tape transport.

Digital cassette tape transports, particularly to those operating in streaming mode, as contrasted with start/stop mode, have come to find extensive use as peripherals of computer systems. The current trend in such tape transports is toward greater tape capacity. This trend best manifests itself as an increasingly greater number of tracks on the tape. Such an increase in the number of tracks necessarily incurs a more and more decrease in the width of each track as well as in the spaces between the tracks; indeed, one of the latest high capacity tapes has as many as twenty nine tracks, compared with eight tracks on standard digital audio tape. Each of the twenty nine tracks has a width of only 0.15 millimeter. Thus the exact placement of the head unit on tape tracks is becoming increasingly more difficult with an increase in the number of tracks.

Inserted in a tape transport, a tape cartridge is mechanically positioned therein, and the tape extends along a predefined transport path defined by guide members. The final position of the tape cartridge in the tape transport, or of the transverse position of the tape, relative to the head unit, is subject to variations that can be tolerated in the case of eight track audio tape, but not in the case of high track density tape, if the position of the head unit is to be controlled with respect to the tape tracks merely by, for example, a stepper motor in combination with a lead screw mechanism.

U.S. Pat. No. 4,786,984 to Seeman reflects a conventional attempt at more stringently controlling the transverse position of the head unit relative to high track density tape despite the unavoidable variations on the final position of the tape cassette, and of the tape itself, relative to the tape transport. Seeman teaches to detect a tape edge as a reference location of the head unit, from which the unit may be moved to and positioned on any track for reading and writing.

SUMMARY OF THE INVENTION

The present invention adopts a different approach for precise control of the transverse position of a read/write head unit with respect to multitrack magnetic tape, particularly to that having a number of high density tracks.

Briefly stated in one aspect thereof, the invention presupposes the use of a length of magnetic recording tape having a plurality of parallel data tracks extending longitudinally thereof, and a reference track formed between one end of the tape and a selected one (e.g. Track Zero) of the data tracks and aligned therewith. The reference track has recorded thereon a reference pattern which, when read by a head unit, provides a corresponding reference signal that differs in level depending upon the transverse location of the head unit on the reference track.

The invention teaches how to position the head unit on the centerline of the reference track and hence of the selected data track formed in alignment therewith. Toward this end the head unit is incrementally moved across the reference track from one longitudinal edge thereof toward another through a series of transverse locations thereon for reading the reference pattern and hence for providing the reference signal, the transverse locations having predetermined spacings one from another in the transverse direction of the tape. The level of the reference signal is detected at each of the transverse locations. Then the head unit is positioned on the reference track centerline by moving, if necessary, the head unit from the last of the series of transverse locations back toward the one longitudinal edge of the reference track a distance that is predetermined according to each particular set of reference signal levels detected at the series of transverse locations on the reference track.

In order to determine the distance from the last of the series of transverse locations to the centerline position on the reference track, it is suggested that a number of similar tape transport and similar tape assemblies be tested for amassing data concerning relationship between each set of reference signal levels and the distance in question. The amassed data may then be classified into several standard categories, each comprising an allowable range of deviations from a different standard set of reference signal levels, according to the distance to be traversed by the head unit. Each particular set of reference signal levels may then be referred to the standard categories in order to determine which one of them the set of reference signal levels belongs to. Thus, once the set of reference signal levels has proved to belong to either of the standard categories, the head unit can be moved to the track centerline position the distance corresponding to that standard category.

Preferably, for more precisely controlling the head position on the reference track, the difference may be obtained between the reference signal level detected at each transverse location and that at the preceding transverse location. The differences may further be cumulatively added together. The set of cumulative additions thus obtained may then be referred to standard categories each comprising an allowable range of deviations from a standard set of cumulative additions and a corresponding distance to be traversed by the head unit from the last of the series of transverse locations to the track centerline position.

The reference track may be used either solely for head position control or also for the recording of a reference burst customarily employed for gain control of a read amplifier. Either way, the reference track can be of very short duration, and of even shorter duration if the tape is run at a lower speed during the positioning of the head unit in its centerline position than that during normal data transfer between the head unit and the data tracks.

The above and other features and advantages of this invention and the manner of realizing them will become more apparent, and the invention itself will best be understood, from a study of the following description and appended claims, with reference had to the attached drawings showing the best mode of carrying out the invention.

DETAILED DESCRIPTION

The invention will now be described in detail in terms of the tape transport of FIG. 1 for use with a two-reel, belt driven, multitrack tape cartridge introduced by Minnesota Mining and Manufacturing Company. Generally designated 10, the tape cartridge has a housing 12 within which a length of magnetic tape 14 extends between a pair of reel hubs 16 and 18 along a tape guide path defined by two guide rollers 20 and 22. Also enclosed in the cartridge housing 12 is a flexible, endless belt 24 for driving the tape between the reel hubs 16 and 18. The belt 24 extends along a belt guide path around two guide rollers 26 and 28 adjacent the respective reel hubs 16 and 18 and a driving roller 30 therebetween and contacts the tape 14 on the reel hubs.

The rotation of the belt driving roller 30 causes the belt 24 to frictionally drive the reel hubs to tension the tape 14 and to move the tape between the reels. The tape 14 travels in the direction of the arrow 32, for example, between the tape guide rollers 20 and 22 with the travel of the drive belt 24 in the direction of the arrow 34 between the belt guide rollers 26 and 28.

Figures 2, 3:
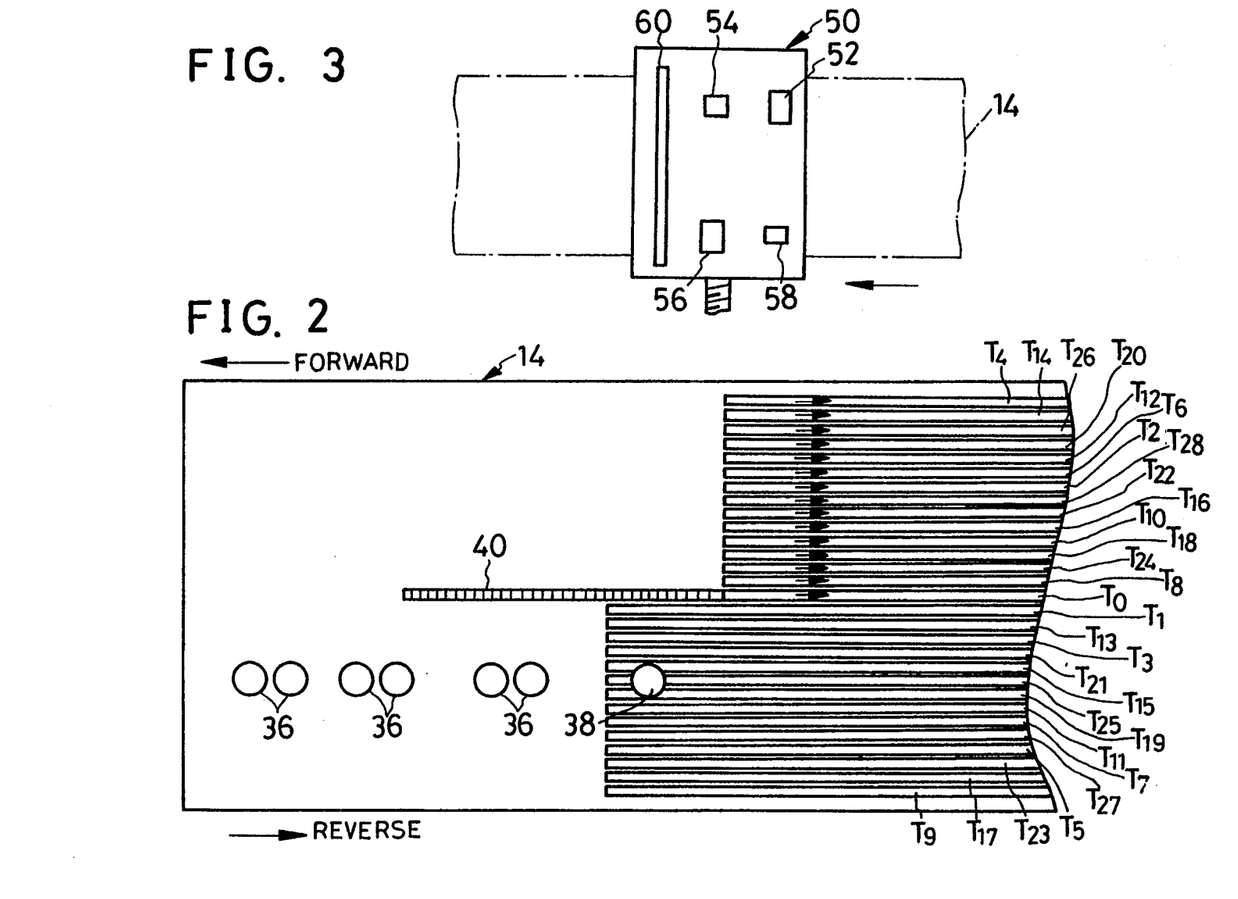
FIG. 2 is an enlarged, fragmentary plan view of a length of bidirectional, multitrack magnetic tape for use with the tape transport of FIG. 1.
FIG. 3 is an enlarged plan view of the read/write head unit of the FIG. 1 tape transport.

With reference to FIG. 2, which shows only the beginning part of the tape 14 on a greatly enlarged scale, it will be noted that the tape has twenty nine parallel data tracks $T_0$–$T_{25}$ extending longitudinally thereof. All the data tracks have each a width of 0.15 millimeter. Of these, fifteen even numbered tracks $T_0$, $T_2$, $T_4$, $T_6$, $T_8$, $T_{10}$, $T_{12}$, $T_{14}$, $T_{16}$, $T_{18}$, $T_{20}$, $T_{22}$, $T_{24}$, $T_{26}$ and $T_{28}$ are forward tracks, that is, tracks on which data is written during forward tape travel from the beginning, shown directed to the left in FIG. 2, toward the end of the tape 14. All these forward tracks are disposed on the top half, as seen in FIG. 2, of the tape.

The other, odd numbered tracks $T_1$, $T_3$, $T_5$, $T_7$, $T_9$, $T_{11}$, $T_{13}$, $T_{15}$, $T_{17}$, $T_{19}$, $T_{21}$, $T_{23}$, $T_{25}$ and $T_{27}$ are reverse tracks, that is, the tracks on which data is written during reverse tape travel from the end toward the beginning of the tape 14. These reverse tracks are disposed on the bottom half, as viewed in FIG. 2, of the tape.

The tape 14 is conventionally formed with a beginning-of-tape (BOT) marker 36 and a load point marker 38 on its beginning portion. The BOT marker 36 is shown as three pairs of holes spaced longitudinally of the tape, and the load point marker 38 as a single hole, all the holes being aligned. It is understood that an end-of-tape (EOT) marker and a load point marker are similarly formed on the end portion, not shown, of the tape.

FIG. 2 also reveals a reference burst track 40 formed immediately downstream, with respect to the forward traveling direction of the tape, of the first forward data track $T_0$, Track Zero, in alignment therewith. The reference burst track 40 has recorded thereon a reference burst as in the form of a 250 kilohertz rectangular wave of predetermined amplitude. The length of the reference burst track can be as short as, say, 54 to 60 inches. It is understood that a similar reference burst track is provided immediately downstream, with respect to the reverse traveling direction of the tape, of the first reverse data track $T_1$, Track One, in alignment therewith. Each reference burst track is the same in width as each of the data tracks $T_0$–$T_{25}$.

Figure 1:
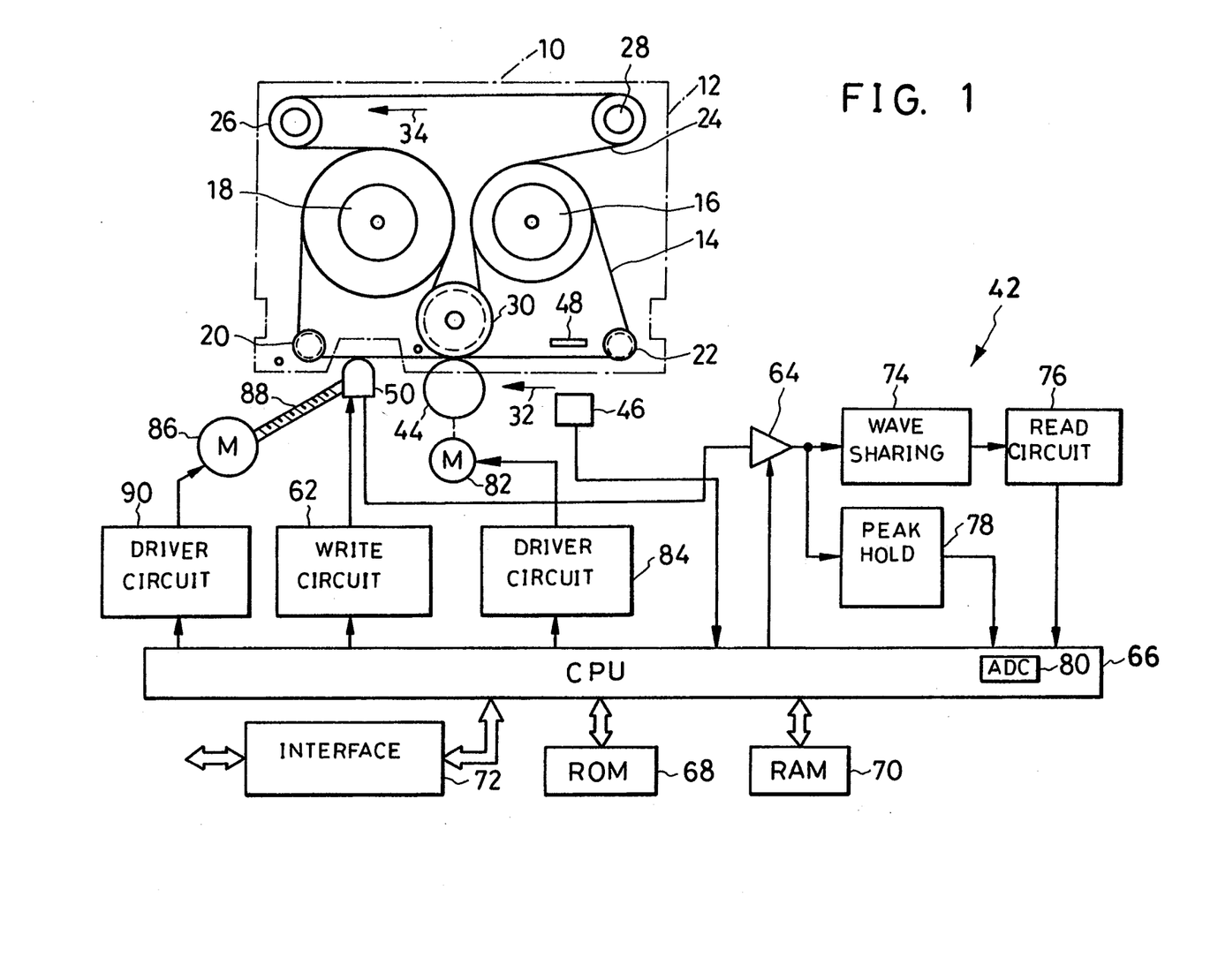
FIG. 1 is a block diagram of an example of multitrack tape transport embodying the principles of this invention, shown together with a pictorial representation of a tape cartridge for use therewith.

The tape transport for use with the belt driven tape cartridge 10, including the multitrack tape 14 of the FIG. 2 track arrangement, is shown block diagrammatically in FIG. 1 and therein generally designated 42. The tape transport 42 has a drive roller 44 which makes driving engagement with the belt driving roller 30, without contacting the tape 14, through an access opening, not shown, in one edgewall of the cartridge housing 12. At 46 is shown an optical BOT/EOT sensor which senses the BOT and EOT holes and load point holes in the tape 14. A mirror 48 is mounted within the cartridge housing 12 to aid in the optical sensing of the tape holes.

The tape transport 42 has a bidirectional combined read/write head unit 50. As shown on an enlarged scale in FIG. 3, the read/write head unit 50 comprises a forward write gap 52, forward read gap 54, reverse write gap 56, reverse read gap 58, and erase gap 60. The write gaps 52 and 56 have each a length approximately equal to the width (0.15 millimeter) of each track on the tape 14 whereas the read gaps 54 and 58 have each a smaller length of 0.10 millimeter. The erase gap 60 has a length spanning the complete width of the tape 14.

With reference back to FIG. 1 the forward and reverse write windings, not shown, of the head unit 50 are connected to a write circuit 62; the forward and reverse read windings, not shown, to a variable gain read amplifier 64; and the erase winding, not shown, to an erase circuit, not shown. Actually, however, a switch circuit is provided for selectively connecting the write circuit 62 to the forward and reverse write windings, and another switch circuit for selectively connecting the read amplifier 64 to the forward and reverse write windings. Such switch circuits are not shown for simplicity.

The write circuit 62 is connected to a tape transport controller or programmable microcomputer which is shown to comprise a central processor unit (CPU) 66, a read only memory (ROM) 68, and a random access memory (RAM) 70. The CPU 66 is interfaced at 72 with a host system, not shown. The write circuit 62 receives data to be written, as well as a reference burst signal, from the CPU 66 and delivers a corresponding write signal to either of the forward and reverse heads as the unshown switch circuit is actuated by the CPU.

The variable gain read amplifier 64 has its output connected to a wave shaping circuit 74, thence to a read circuit 76, and thence to the CPU 66. The read circuit 76 recreates the data read on the tape 24 by the forward or reverse read head. The gain of the read amplifier 64 is customarily controlled by a gain control signal supplied from the CPU 66 to its control input.

Also connected to the output of the read amplifier 64 is a peak hold circuit 78 for detecting at regular intervals the level of the amplified read head output representative of the reference burst signal read on either of the two reference burst tracks 40. The successive read amplifier output voltage values thus obtained are subsequently digitized by an analog to digital converter 80 which is shown built into the CPU 66. The CPU utilizes the digital samples of the reference burst signal level not only for controlling the gain of the read amplifier 64 according to the prior art, but also for controlling the initial transverse position of the head unit 50 on the tape 14 according to the invention.

For driving the tape 14 along the guide path there is provided a bidirectional, variable speed electric motor 82 which is mechanically coupled to the drive roller 44. A motor driver circuit 84 is electrically connected to the tape drive motor 82 for controllably driving the same at a speed specified by the CPU 66.

The head unit 50 is movable transversely of the tape 14 by small increments or steps in order to be positioned in centerline alignment with the reference burst tracks 40, and for accessing the individual data tracks $T_0$–$T_{25}$ thereon. Employed to this end is a bidirectional motor 86 of the known electrically stepping type which is coupled to the head unit 50 via a lead screw 88 or like motion translating mechanism. A driver circuit 90 controllably energizes the stepper motor 86 under the direction of the CPU 66 for causing the same to incrementally drive the head unit 50 across the tape 14.

Stated in one aspect thereof, the present invention teaches how to initialize the forward read head of the head unit 50 precisely on the centerline of the forward reference burst track 40 on the tape 14 prior to reading data on any of the forward data tracks $T_0$, $T_2$, $T_4$, $T_6$, $T_8$, $T_{10}$, $T_{12}$, $T_{14}$, $T_{16}$, $T_{18}$, $T_{20}$, $T_{22}$, $T_{24}$, $T_{26}$ and $T_{28}$. The tape transport 42 of the foregoing construction automatically performs such positioning of the head unit in accordance with a forward initialization routine which has been factory introduced into the ROM 68. The sequence of operations involved in the forward initialization routine is shown divided into FIGS. 4A and 4B.

Figure 4A:
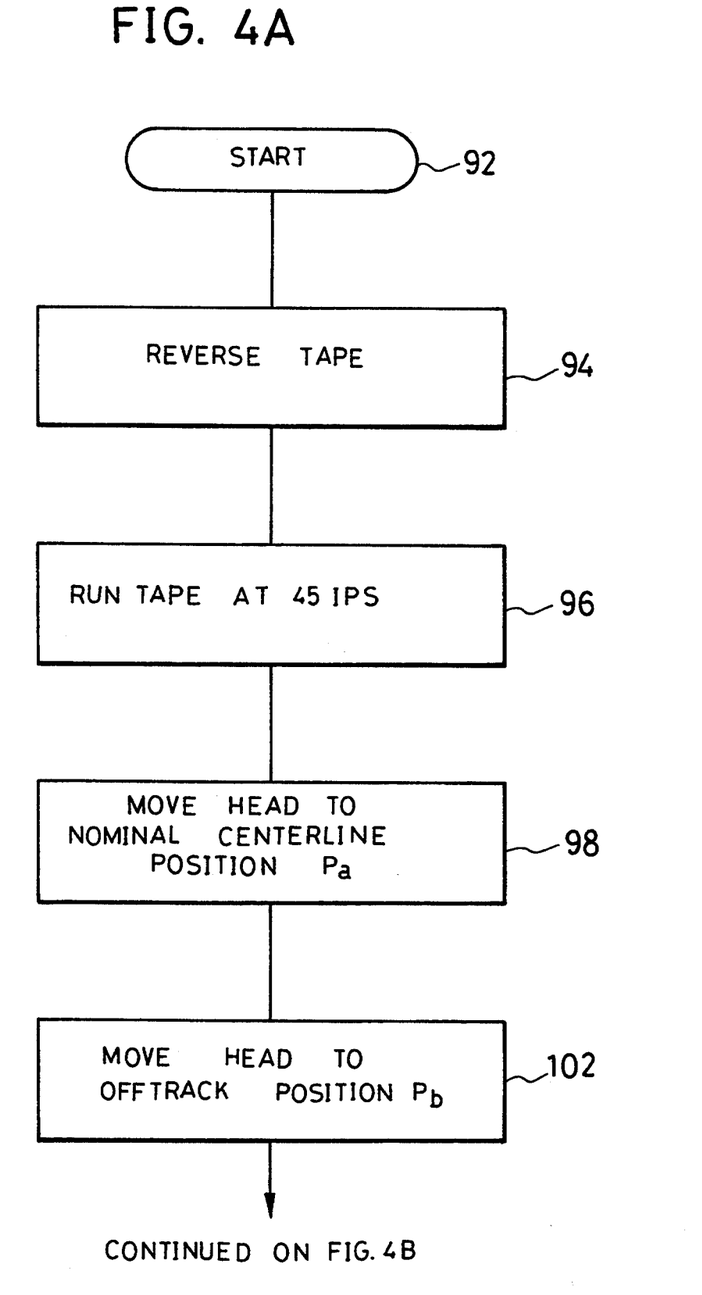
FIGS. 4A and 4B are in combination a flowchart showing how the head unit is positioned on the centerline of the reference burst track on the FIG. 2 tape in the FIG. 1 tape transport.

Starting at 92 in FIG. 4A, the forward initialization routine dictates at a block 94 to reverse the tape 14 to its BOT. Preferably, the tape may be reversed at this time until the intermediate one of the three pairs of BOT holes 36, FIG. 2, is detected by the sensor 46. Then the tape is run forwardly at a relatively low speed of, say, 45 inches per second (ips), as set forth in the block 96. The tape speed of 45 ips is called low because it is understood that the tape is to be transported at 80 ips when data is being written on or read from the data tracks $T_0$–$T_{28}$. The low tape speed makes it possible to make the forward reference burst track 40, as well as the unshown reverse reference burst track, correspondingly shorter.

Figure 5:
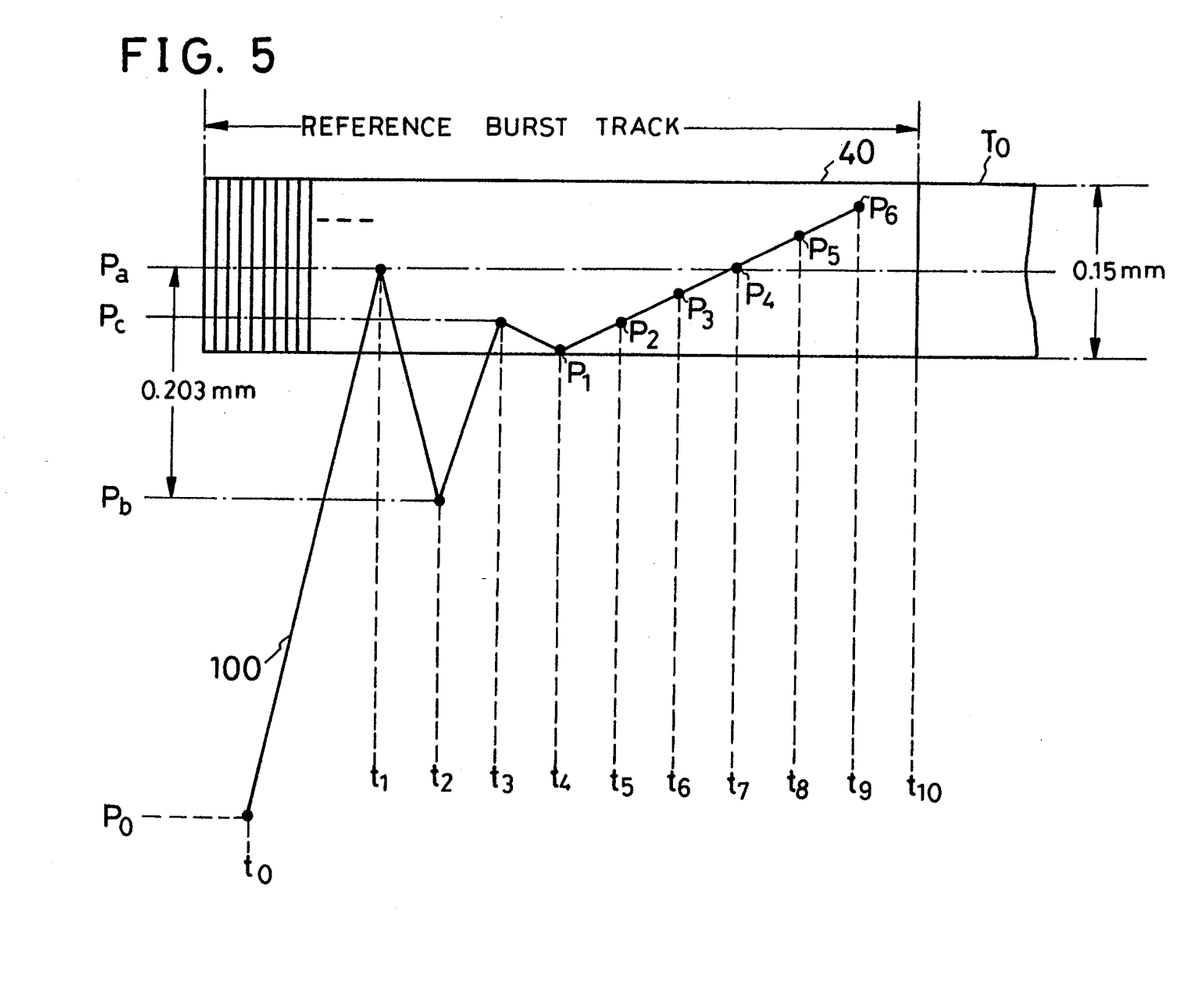
FIG. 5 is a diagram explanatory of how the head unit is moved relative to the reference burst track in order to be positioned on its centerline.

Then, as illustrated in FIG. 5, the head unit is moved from its standby position Po to a nominal centerline position Pa on the forward reference burst track 40, as indicated in the block 98. The standby position Po, which may be adjacent one longitudinal edge of the tape, is mechanically determined by the head positioning mechanism within the tape transport 42 but not necessarily so relative to the tape cartridge 10. The nominal centerline position Pa, on the other hand, is a position spaced a predetermined distance from the standby position Po transversely of the tape. The reference burst has been recorded on the tape after positioning the forward write gap of the head unit in this nominal centerline position, and data written on Track Zero $T_0$ immediately thereafter. The reference burst track 40 and the first forward track $T_0$ are therefore in exact alignment.

However, even though the head unit has now been moved from standby position Po to nominal centerline position Pa, it may, or may not, be in the actual centerline position of the reference burst track 40 because the relative positions of the tape cartridge and the head unit when the relative burst track has been created may have been different from now. The actual centerline position must therefore be found subsequently. In any event, however, the distance from standby position Po to nominal centerline position Pa is predetermined, so that the head unit will move to the nominal centerline position by supplying a correspondingly predetermined number of stepping pulses from CPU 66, FIG. 1, to stepper motor driver circuit 90.

FIG. 5 indicates that the travel of the head unit from standby position Po to nominal centerline position Pa starts at time $t_0$ and ends at time $t_1$. The line 100 in this figure represents the distance traversed by the head unit against time, so that the two different angles at which the line segments are drawn represent two different traveling speeds of the head unit. It will therefore, be noted that the stepper motor 86 rotates at a relatively high speed of, say, from eight to 10 milliseconds (ms) per step (e.g. 0.0203 millimeters) from time $t_0$ to time $t_9$, and at a reduced speed of, say, 50 ms/step from time $t_3$ to time $t_9$. This reduction of speed at the time $t_3$ is because the accurate detection of the reference burst track 40 by the head unit is taken to be completed at the moment. Thus the head unit is moved at the higher speed until the reference burst track is detected, and thereafter at the lower speed for a more difficult task of accurately locating the actual, instead of nominal, centerline of the reference burst track.

According to the next block 102 of the initialization routine, the head unit is moved from nominal centerline position Pa to predetermined offtrack position Pb, FIG. 5, off the reference burst track 40. The offtrack position Pb is spaced, typically, −10 stepper motor steps from the nominal centerline position Pa, that is, a distance equivalent to the 10 steps of the stepper motor 86 in a downward direction, as viewed in FIG. 5, from the reference burst track toward the standby position Po. This distance may be 0.203 min. As required or desired, however, the flow-charted initialization routine may be modified so that the head unit may be moved directly from standby position Po to offtrack position Pb.

Figure 4B:
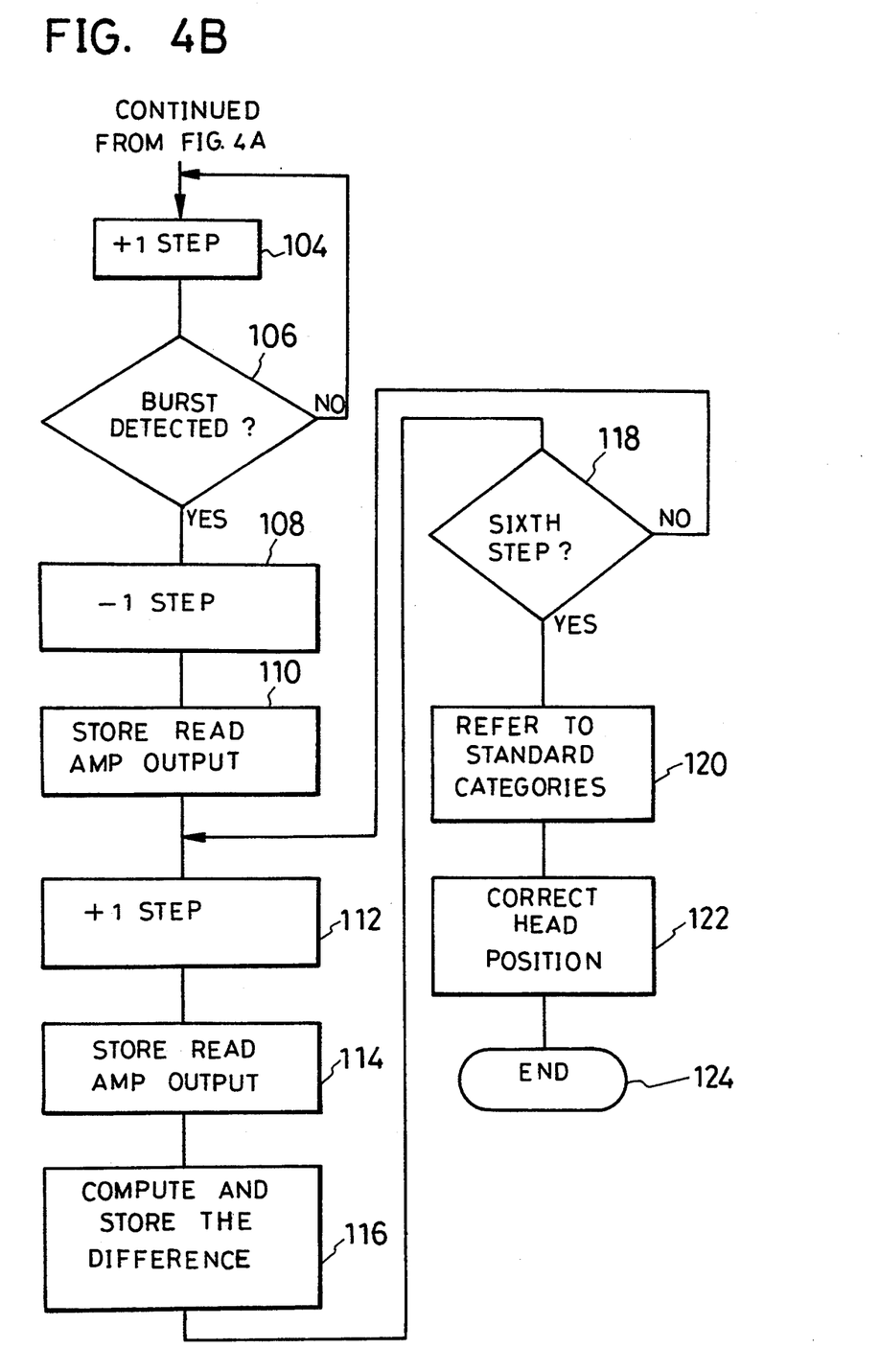

Then comes the "+1 Step" block 104 in FIG. 4B. The head unit is incremented from the offtrack position Pb back toward the reference burst track 40 according to this block. The next "Burst Detected?" node 106 asks if the reference burst track has been detected as a result of such incremental travel of the head unit.

In order to determine whether the head unit has arrived at the reference burst track or not, the output level of the read amplifier 64 is detected by the peak hold circuit 78 at each step, or at each predetermined number of steps, of the stepper motor 86. The thus detected values of the read amplifier output voltage are successively delivered to the CPU 66. Each cycle of the reference burst signal reproduced by the head unit is shorter than each step of the stepper motor, so much so that the amplitude of the corresponding output from the read amplifier 64 can be sampled at each step for delivery the CPU. Preferably, however, the gain of the read amplifier 64 may be made higher during the reading of the reference burst (that is, from $t_2$ to $t_9$, from $t_1$ to $t_9$, or from $t_0$ to $t_9$ in FIG. 5) than during the subsequent reading of data on the data tracks $T_0$-$T_{28}$.

It is also recommended that, for the detection of the reference burst track from $t_2$ to $t_3$, as well as for the determination of its centerline position from $t_4$ to $t_9$, not only the output level of the read amplifier 64 be detected at each step, but also the difference be computed between the voltage value detected at each step and that at the preceding step. The output voltage of the read amplifier 64 will be zero for some time after the head unit starts traveling from the offtrack position Pb toward the reference burst track according to the "+1 Step" block 104 and "Burst Detected?" node 106. However, as the forward read gap 54 of the head unit comes to ride over the reference burst track, the read amplifier 64 will start producing an output voltage. The output voltage of the read amplifier will inevitably include a noise component. The influences of such noise component will be reduced to a minimum by comparing the voltage value obtained at each step with that at the preceding step. Consequently, the transverse locations of the head unit relative to the reference burst track will be controlled more accurately than if the head unit positions were determined solely on the basis of the discrete voltage value detected at each step.

The answer to the "Burst Detected?" node 106 is yes when the read amplifier output level at any step becomes greater than that at the preceding step by, say, 0.1 volt or more. As indicated in both FIGS. 5 and 6, the reference burst track 40 has thus been detected at the time $t_3$, and the head unit 50 (or its forward read gap 54 to be more exact) is now in an ontrack position Pc on the reference burst track.

The answer "yes" to the "Burst Detected?" node 106 directs the initialization routine to a "−1 Step" block 108. The head unit is moved one step from the ontrack position Pc to a track edge position $P_1$ on or adjacent one longitudinal edge of the reference burst track according to this block 108. The output level of the read amplifier 64 is detected, digitized, and stored on the RAM 70, FIG. 1, when the head unit comes to the track edge position $P_1$, as set forth in the block 110.

From this track edge position $P_1$ the head unit is incrementally moved across the reference burst track 40 through a series of transverse locations $P_2$-$P_6$ thereon for finding its actual centerline position according to the remainder of the routine shown in FIG. 4B. The transverse locations $P_1$-$P_6$ are spaced one stepper motor step from each other, as indicated at the "+1 Step" block 112, and the output level of the read amplifier is detected, digitized, and stored on the RAM 70 at each such transverse location according to the block 114. Further, at each such transverse location, the difference is computed between the detected output value and the preceding one according to the block 116.

The next "Sixth Step?" node 118 asks whether the head unit has arrived at the last transverse locations $P_6$ or not. The routine returns to the "+1 Step" block 112 if the answer to the node 118 is no. The procedure of the blocks 112, 114 and 116 is therefore repeated until the head unit travels through all the transverse locations $P_1$-$P_6$.

Figure 6:
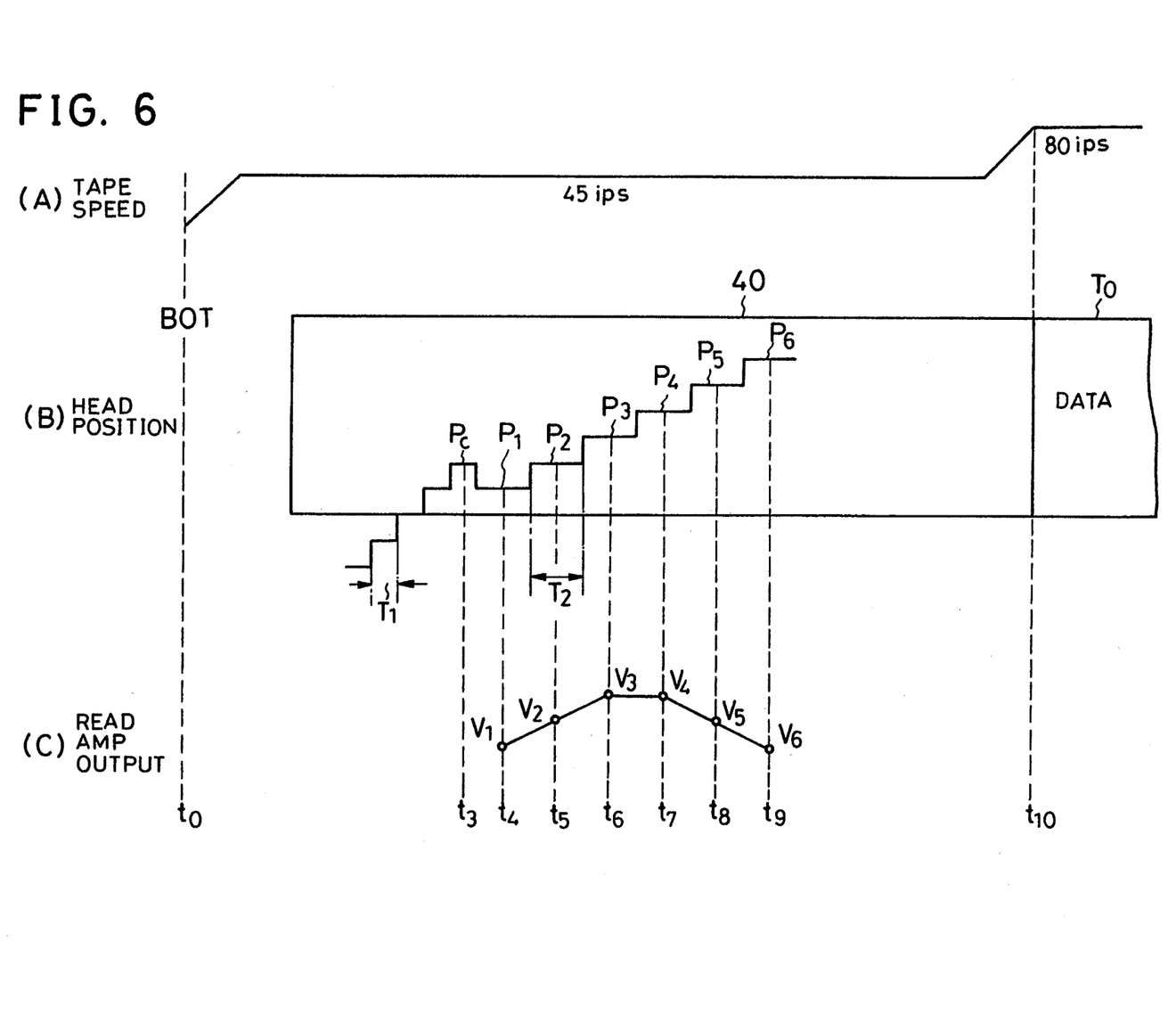
FIG. 6, consisting of (A) through (C), is a timing chart showing tape speed, head unit positions on the reference burst track, and output voltage from the read amplifier, in timed relationship to one another.

FIG. 6 indicates at (B) the transverse locations $P_1$-$P_6$ of the head unit on the reference burst track 14, and at (C) examples of read amplifier output levels $V_1$-$V_6$ detected at these transverse locations and at times $t_4$-$t_9$. The output level curve is plotted on the assumption that the actual centerline of the reference burst track is somewhere between the transverse locations $P_3$ and $P_4$.

Upon completion of the cyclic procedure of the blocks 112, 114 and 116 and node 118, the routine proceeds to blocks 120 and 122. The head unit is to be moved from the last $P_6$ of the series of transverse locations $P_1$-$P_6$ to the actual centerline position according to these blocks 120 and 122, as set forth in detail hereafter.

In practice, as has been stated, the positional relationship between the head unit and the reference burst track is subject to change from one tape cartridge to another, from one tape transport to another, and even as the same tape cartridge is withdrawn from and reinserted in the same tape transport. The read amplifier output levels $V_1$-$V_6$ are therefore also subject to change in each case.

However, as a result of the applicant's tests conducted with a number of mass produced tape transports of the FIG. 1 construction and a number of commercially available tape cartridges, it has proved that some definite relationships exist between the various different sets of read amplifier output voltages $V_1$-$V_6$ and the actual centerline of the reference burst track with respect to the transverse locations $P_1$-$P_6$. If each such relationship is known, it can also be known how many steps the head unit must be moved from the last transverse location $P_6$ to the actual centerline position. It has further proved that, although the read amplifier output voltages $V_1$-$V_6$ do differ from case to case as aforesaid, all such different sets of read amplifier output voltages are classifiable into several standards according to the numbers of steps required for moving the head unit from the last transverse location $P_6$ to the centerline position. Thus, if each particular set of read amplifier output voltages is found to belong to either of the standards, the head unit can be subsequently readily moved to the centerline position. The present invention is essentially based upon this discovery.

FIG. 7 is the analogous graphic representations of seven standard categories of expected different sets of read amplifier output voltages, and corresponding numbers of stepper motor steps required for moving the head unit from the last transverse location $P_6$ to the track centerline position, which are both stored on the ROM 68 of the FIG. 1 tape transport 42 in terms of digital data. The standard category data have been compiled from the noted applicant's tests with mass produced tape transports and commercially available tape cartridges.

The digits 1-5 on the horizontal axis of each graph in FIG. 7 correspond to the times $t_5$-$T_9$ and therefore to the transverse locations $P_2$-$P_6$ in FIGS. 5 and 6. The vertical axis, however, does not represent the voltage values detected at these locations but the cumulative additions of the differences between the voltage value detected at each such location and that at the preceding location. The indicia $L_1$ and $L_2$ in each graph denote the upper and lower limits, respectively, of allowable deviations from each standard.

In conformity with such standard category data stored on the ROM 68, the CPU 66 performs the following computations according to the block 116 of the initialization routine:

At $t_5$: $V_2-V_1=D_1$.

At $t_6$: $V_3-V_2=D_2$, and $D_1+D_2=Da$.

At $t_7$: $V_4-V_3=D_3$, and $D_1+D_2+D_3=Db$.

At $t_8$: $V_5-V_4=D_4$, and $D_1+D_2+D_3+D_4=Dc$.

At $t_9$: $V_6-V_5=D_5$, and $D_1+D_2+D_3+D_4+D_5=Dd$.

The set of values $D_1$, Da–Dd computed as above is compared with the seven standard categories of FIG. 7 one after another according to the "Refer to Standard Categories" block 120 of the initialization routine. The set of values $D_1$, Da–Dd is first compared with the first standard category of FIG. 7(A) to determine whether it falls between the limits $L_1$ and $L_2$ of this category. If it does, then the CPU 66 causes the stepper motor 86 to rotate $-2$ step according to the "Correct Head Position" block 122. Thereupon the head unit 50 will travel from the last transverse location $P_6$ to the fourth transverse location $P_4$. The head unit 50 is now in the actual centerline position on the reference back track 40, and the routine ends at 124.

Figure 7A:
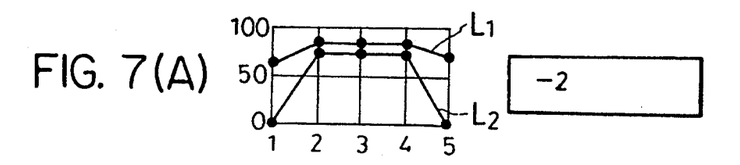
FIG. 7, consisting of (A) through (G), graphically illustrates the standard category data stored on the read only memory of the FIG. 1 tape transport.
Figure 7B:
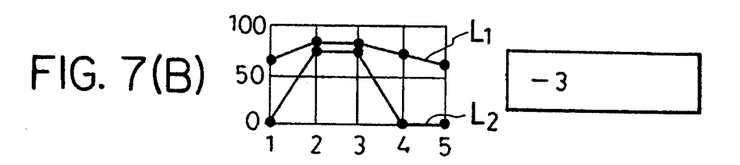
Figure 7C:
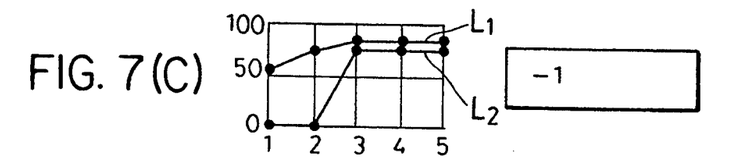
Figure 7D:
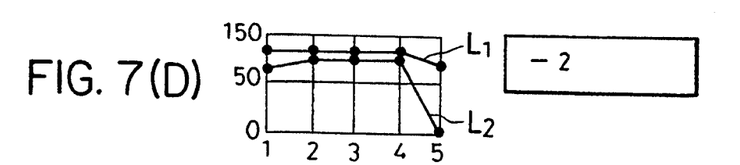
Figure 7E:
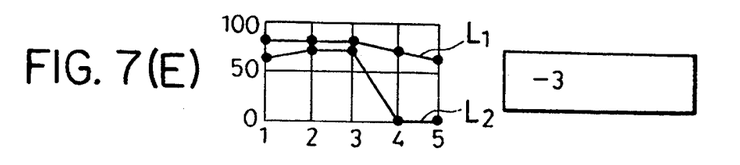
Figure 7F:
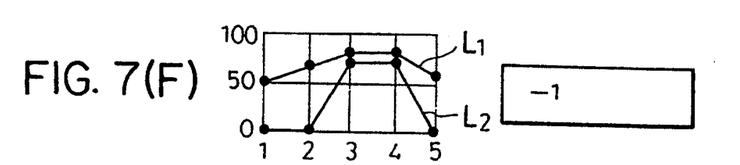
Figure 7G:
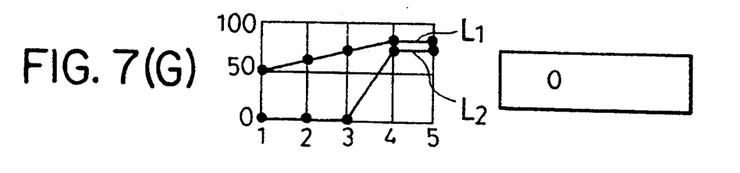

The set of values $D_1$, Da–Dd is subsequently compared with the second standard category of FIG. 7(B) if it is found to fall outside the first standard category. The head unit 50 is moved $-3$ step from the last $P_6$ to third $P_3$ transverse location if the value set has proved to belong to the second standard category. If the value set has proved to fall outside the second standard category, either, then it is referred to the third standard category of FIG. 7(C). The value set is similarly referred to the successive standard categories until the standard category encompassing the value set is found, and the position of the head unit corrected accordingly.

In some rare cases, however, the value set may prove to belong to none of the standard categories. Then the foregoing initialization routine may be retried, possibly after readjustment of the relative positions of the head unit and the tape 14 in the transverse direction of the tape. The routine may be abandoned, and the head unit returned to the nomimal centerline position Pa, FIG. 5, on the reference burst track 40, in the case where the head position has not been correctable from the final transverse position $P_6$ even by a predetermined number of retries.

It will be recalled that the tape has been traveling at 45 ips, as indicated at (A) in FIG. 6 and according to the block 96, FIG. 4A, of the initialization routine, while the head unit 50 is being positioned on the centerline of the reference burst track 40. The positioning of the head unit on the reference burst track centerline will be completed before the head unit starts riding over Track Zero $T_0$, the first forward data track. Since the reference burst track is aligned with Track Zero, the positioning of the head unit on the centerline of the reference burst track is tantamount to the positioning of the head unit on the centerline of Track Zero. The tape speed may be increased to 80 ips, as indicated also at (A) in FIG. 6, when the head units rides off the reference burst track onto Track Zero.

The head unit can be accurately transferred from Track Zero to any other of the forward data tracks because now the head unit is exactly in the centerline position on Track Zero. It is understood that the CPU 66 conventionally includes a stepping pulse counter for controlling the transverse position of the head unit across the tape. The subsequent transverse location of the head unit on the tape is easily and accurately controllable by the counter.

Although the present invention has been shown and described in highly specific aspects thereof, it is not desired that the invention be limited by the exact details of the showing of the drawings or the description thereof. The following, then, is a brief list of possible modifications, alterations and adaptations of the foregoing disclosure which are all believed to fall within the scope of this invention:

1. A secondary set of standard categories, in addition to the primary set of standard categories depicted in FIG. 7, could be stored on the ROM 68. Each set of values $D_1$, Da–Dd might then be referred to the secondary set of standard categories in event it has proved to belong to none of the primary set of standard categories.

2. The set of voltage values $V_1-V_6$ detected at the series of transverse locations $P_1-P_6$ could be used directly for the determination of the track centerline position. In this case each standard category stored on the ROM 68 might represent an allowable range of deviations of such voltage values.

3. The tape could be started traveling at the time $t_2$ in FIG. 4 when the head unit is in the offtrack position Pb.

4. The stepper motor could be replaced by other types of direct current motors whose rotation was controllable incrementally.

5. The invention could be applied to various multitrack tape cartridges or cassettes other than the exemplified two-reel, belt driven tape cartridge.

What is claimed is:

1. A method of controlling the position of a head unit in a transverse direction of magnetic recording tape, comprising:
   (a) providing a length of magnetic recording tape having a plurality of parallel data tracks extending longitudinally thereof, and a reference track formed between one end of the tape and a selected one of the data tracks and aligned with the selected data track, the reference track having recorded thereon a reference pattern which, when read by a head unit, provides a corresponding reference signal that differs in level depending upon transverse locations of the head unit on the reference track;
   (b) moving the tape from the one end thereof toward another along a predefined guide path where the tape is moved at a lower speed when the reference track is traveling past the head unit or positioning the head unit than when the data tracks are traveling past the head unit for data transfer therewith;
   (c) incrementally moving the head unit across the reference track on the tape from one longitudinal edge of the reference track toward another through a series of transverse locations thereon for reading the reference pattern and hence for providing the reference signal, the transverse locations having predetermined spacings one from another in the transverse direction of the tape;
   (d) detecting the level of the reference signal at each of the transverse locations; and
   (e) positioning the head unit on a centerline of the reference track and hence of the selected data track by moving, if necessary, the head unit from the last of the series of transverse locations back toward the one longitudinal edge of the reference track a distance that is predetermined according to each particular set of reference signal levels detected at the series of transverse locations on the reference track.

2. In a tape transport for use with a magnetic tape assembly, a method of controlling the position of a head unit in a transverse direction of tape, comprising:
  (a) providing a magnetic tape assembly including a length of magnetic tape having a plurality of parallel data tracks extending longitudinally thereof, and a reference track formed between one end of the tape and a selected one of the data tracks and aligned with the selected data track, the reference track having recorded thereon a reference pattern which, when read by a head unit, provides a corresponding reference signal that differs in level depending upon transverse locations of the head unit on the reference track;
  (b) moving the tape from the one end thereof toward another along a predefined guide path;
  (c) incrementally moving the head unit across the reference track on the tape from one longitudinal edge of the reference track toward another through a series of transverse locations thereon for reading the reference pattern and hence for providing the reference signal, the transverse locations having predetermined spacings one from another in the transverse direction of the tape;
  (d) detecting the level of the reference signal at each of the transverse locations;
  (e) testing a plurality of similar tape transports and similar tape assemblies according to steps (a) through (d) for compiling data concerning relationship between each set of reference signal levels detected at the series of transverse locations on a reference track and a corresponding distance between the last of the series of transverse locations and the centerline of the reference track in the transverse direction of the tape;
  (f) classifying the data into a plurality of standard categories each comprising an allowable range of deviations from a standard set of reference signal levels according to a distance to be traversed by the head unit from the last of the series of transverse locations to the centerline of the reference track;
  (g) referring the set of reference signal levels detected at step (d) to the standard categories in order to determine which one of the standard categories the set of reference signal levels belongs to; and
  (h) positioning the head unit on the centerline of the reference track and hence of the selected data track by moving, if necessary, the head unit from the last of the series of transverse locations back toward the one longitudinal edge of the reference track the distance corresponding to the standard category to which the detected set of reference signal levels has proved to belong.

3. In a tape transport for use with a magnetic tape assembly, is a method of controlling the position of a head unit in a transverse direction of tape, comprising:
  (a) providing a magnetic tape assembly including a length of magnetic tape having a plurality of parallel data tracks extending longitudinally thereof, and a reference track formed between one end of the tape and a selected one of the data tracks and aligned with the selected data track, the reference track having recorded thereon a corresponding reference pattern which, when read by a head unit, provides a reference signal that differs in level depending upon transverse locations of the head unit on the reference track;
  (b) moving the tape from the one end thereof toward another along a predefined guide path;
  (c) incrementally moving the head unit across the reference track on the tape from one longitudinal edge of the reference track toward another through a series of transverse locations thereon for reading the reference pattern and hence for providing the reference signal, the transverse locations having predetermined spacings one from another in the transverse direction of the tape;
  (d) detecting the level of the reference signal at each of the transverse locations;
  (e) obtaining a difference between the reference signal level detected at each transverse location and that at the preceding transverse location;
  (f) obtaining a set of cumulative additions of the successive differences obtained at step (e);
  (g) testing a plurality of similar tape transports and similar tape assemblies according to steps (a) through (f) for compiling data concerning relationship between each set of cumulative additions and a corresponding distance between the last of the series of transverse locations and the centerline of the reference track in the transverse direction of the tape;
  (h) classifying the data into a plurality of standard categories each comprising an allowable range of deviations from a standard set of cumulative additions according to a distance to be traversed by the head unit from the last of the series of transverse locations to the centerline of the reference track;
  (i) referring the set of cumulative additions obtained at step (f) to the standard categories in order to determine which one of the standard categories the set of cumulative additions belongs to; and
  (j) positioning the head unit on the centerline of the reference track and hence of the selected data track by moving, if necessary, the head unit from the last of the series of transverse locations back toward the one longitudinal edge of the reference track the distance corresponding to the standard category to which the detected set of cumulative additions has proved to belong.

4. A system for controlling the position of a head unit in a transverse direction of magnetic recording tape, comprising: p1 (a) a head unit for reading information on a length of magnetic recording tape having a plurality of parallel data tracks extending longitudinally thereof, and a reference track formed between one end of the tape and a selected one of the data tracks and aligned with the selected data track, the reference track having recorded thereon a reference pattern which, when read by the head unit, provides a corresponding reference signal that differs in level depending upon transverse locations of the head unit on the reference track;
  (b) tape transport means for moving the tape from the one end thereof toward another along a predefined guide path and for moving the tape at a lower speed when the reference track is traveling past the head unit for positioning the head unit than when the data tracks are traveling past the head unit for data transfer therewith;

(c) positioning means for incrementally and bidirectionally moving the head unit transversely of the tape, the head positioning means being capable of moving the head unit across the reference track from one longitudinal edge thereof toward another through a series of transverse locations for enabling the head unit to read the reference pattern and hence to provide the reference signal, the transverse locations having predetermined spacings one from another in the transverse direction of the tape;

(d) detector means for detecting the level of the reference signal at each of the transverse locations; and (e) control means connected to the positioning means and the detector means for positioning the head unit on a centerline of the reference track and hence of the selected data track by causing the positioning means to move, if necessary, the head unit from the last of the series of transverse locations back toward the one longitudinal edge of the reference track a distance that is predetermined according to each particular set of reference signal levels detected at the series of transverse locations on the reference track.

5. In a tape transport for use with a magnetic tape assembly, a system for controlling the position of a head unit in a transverse direction of magnetic recording tape, comprising:

(a) a head unit for reading information on a length of magnetic recording tape of a tape assembly, the recording tape having a plurality of parallel data tracks extending longitudinally thereof, and a reference track formed between one end of the tape and a selected one of the data tracks and aligned with the selected data track, the reference track having recorded thereon a reference pattern which, when read by the head unit, provides a corresponding reference signal that differs in level depending upon transverse locations of the head unit on the reference track;

(b) tape transport means for moving the tape from the one end thereof toward another along a predefined guide path;

(c) positioning means for incrementally and bidirectionally moving the head unit transversely of the tape, the head positioning means being capable of moving the head unit across the reference track from one longitudinal edge thereof toward another through a series of transverse locations for enabling the head unit to read the reference pattern and hence to provide the reference signal, the transverse locations having predetermined spacings one from another in the transverse direction of the tape;

(d) detector means for detecting the level of the reference signal at each of the transverse locations; and (e) memory means for storing standard category data, compiled by testing a plurality of similar tape transports and similar tape assemblies, representative of a plurality of standard categories each comprising an allowable range of deviations from a standard set of reference signal levels detected at the series of transverse locations on a reference track and a corresponding distance to be traversed by the head unit from the last of the series of transverse locations to the centerline of the reference track in the transverse direction of the tape; and (f) control means connected to the positioning means and the detector means and the memory means for referring the detected set of reference signal levels to the standard category data stored on the memory means in order to determine which of the standard categories the detected set of reference signal levels belongs to, and for positioning the head unit on the centerline of the reference track and hence of the selected data track by causing the positioning means to move, if necessary, the head unit from the last of the series of transverse locations back toward the one longitudinal edge of the reference track the distance corresponding to the standard category to which the detected set of reference signal levels has proved to belong.

6. In a tape transport for use with a magnetic tape assembly, a system for controlling the position of a head unit in a transverse direction of magnetic recording tape, comprising:

(a) a head unit for reading information on a length of magnetic recording tape of a tape assembly, the recording tape having a plurality of parallel data tracks extending longitudinally thereof, and a reference track formed between one end of the tape and a selected one of the data tracks and aligned with the selected data track, the reference track having recorded thereon a reference pattern which, when read by the head unit, provides a corresponding reference signal that differs in level depending upon transverse locations of the head unit on the reference track;

(b) tape transport means for moving the tape from the one end thereof toward another along a predefined guide path;

(c) positioning means for incrementally and bidirectionally moving the head unit transversely of the tape, the head positioning means being capable of moving the head unit across the reference track from one longitudinal edge thereof toward another through a series of transverse locations for enabling the head unit to read the reference pattern and hence to provide the reference signal, the transverse locations having predetermined spacings one from another in the transverse direction of the tape;

(d) detector means for detecting the level of the reference signal at each of the transverse locations; and (e) subtractor means for obtaining a difference between the reference signal at each transverse location and that at the preceding transverse location;

(f) adder means for obtaining a set of cumulative additions of the differences obtained by the subtractor means;

(g) memory means for storing standard category data, compiled by testing a plurality of similar tape transports and similar tape assemblies, representative of a plurality of standard categories each comprising an allowable range of deviations from a standard set of cumulative additions of the differences and a corresponding distance to be traversed by the head unit from the last of the series of transverse locations to the centerline of the reference track in the transverse direction of the tape; and (f) control means connected to the positioning means and the adder means and the memory means for referring the set of cumulative additions of the differences to the standard category data stored on the memory means in order to determine which of the standard categories the set of cumulative additions belongs to, and for positioning the head unit on the centerline of the reference track and hence of the selected data track by causing the positioning means to move, if necessary, the head unit from the last of the series of transverse locations back toward the one longitudinal edge of the reference track the distance corresponding to the standard category to which the set of cumulative additions has proved to belong.

* * * * *